United States Patent

Koganezawa

[11] Patent Number: 6,064,550
[45] Date of Patent: May 16, 2000

[54] HEAD ACTUATOR WITH DUAL DRIVE MEANS

[75] Inventor: Shinji Koganezawa, Kawasaki, Japan

[73] Assignee: Fujitsu Limited, Kawasaki, Japan

[21] Appl. No.: 09/040,760

[22] Filed: Mar. 18, 1998

[30] Foreign Application Priority Data

Aug. 29, 1997 [JP] Japan ................................ 9-234055

[51] Int. Cl.⁷ .............................. G11B 5/55; G11B 5/596
[52] U.S. Cl. ............................................. 360/106; 360/109
[58] Field of Search .................................. 360/109, 106, 360/104, 98.07, 99.08

[56] References Cited

U.S. PATENT DOCUMENTS

| | | | |
|---|---|---|---|
| 5,216,559 | 6/1993 | Springer | 360/106 |
| 5,521,778 | 5/1996 | Boutaghou et al. | 360/109 |
| 5,745,319 | 4/1998 | Takekado et al. | 360/104 |
| 5,764,444 | 6/1998 | Imamura et al. | 360/109 |
| 5,781,381 | 7/1998 | Koganezawa et al. | 360/109 |
| 5,796,558 | 8/1998 | Hanrahan et al. | 360/109 |
| 5,867,347 | 2/1999 | Knight et al. | 360/104 |
| 5,898,544 | 4/1999 | Krinke et al. | 360/104 |

FOREIGN PATENT DOCUMENTS

| | | |
|---|---|---|
| 6-223515 | 8/1994 | Japan . |
| 7-153207 | 6/1995 | Japan . |
| 8-007503 | 1/1996 | Japan . |
| 8-190768 | 7/1996 | Japan . |
| WO96/37884 | 11/1996 | WIPO . |

*Primary Examiner*—Craig A. Renner
*Attorney, Agent, or Firm*—Greer, Burns & Crain, Ltd.

[57] ABSTRACT

A head actuator includes an actuator arm rotatably mounted on a base, a first drive mechanism rotating the actuator arm, a suspension supporting on a distal end thereof a head slider having a transducer, and a head attachment plate fixed to a proximal end of the suspension. The head actuator also has a protrusion disposed on the head attachment plate, a cavity defined in a distal end of the actuator arm and in which the protrusion is rotatably inserted, and a second drive mechanism for angularly moving the head attachment plate with respect to the actuator arm.

22 Claims, 18 Drawing Sheets

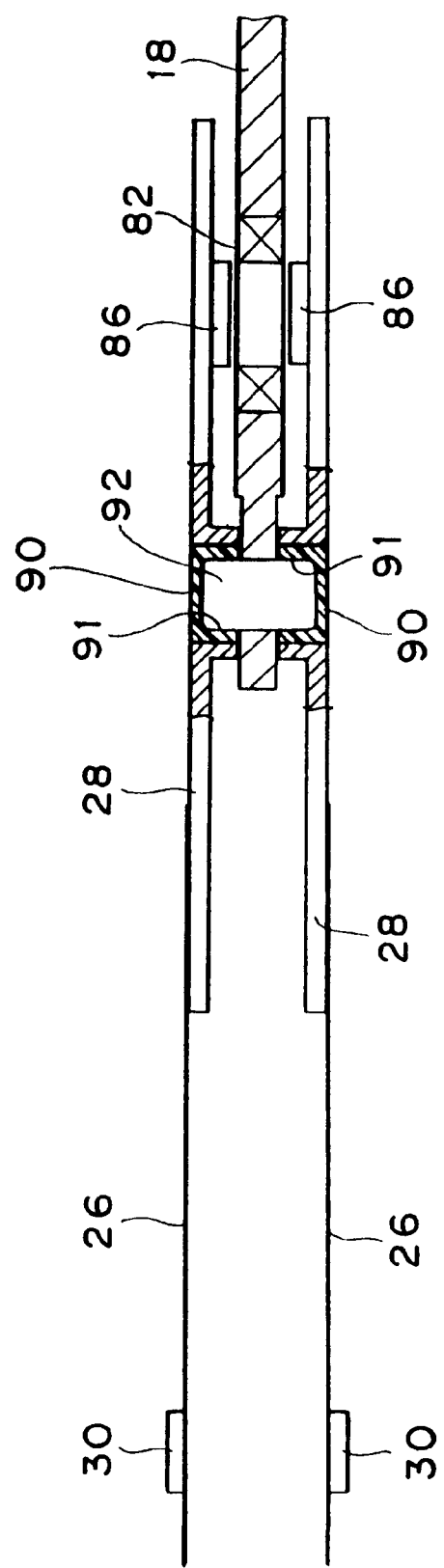

HEAD ACTUATOR WITH DUAL DRIVE MEANS

BACKGROUND OF THE INVENTION

1. Field of the Invention

The present invention relates to a head actuator of a magnetic disk drive.

2. Description of the Related Art

In recent years, magnetic disk drives, which are a type of external storage device for computers, have been made smaller in size and lower in profile. Recently, there have been demands for reducing the power consumption and increasing the recording density of magnetic disk drives. For increasing the recording density of magnetic disk drives, it is indispensable to increase the number of tracks per unit length of the magnetic disks, i.e., to reduce the width of the tracks. Since a magnetic head needs to be positioned over narrow tracks, it is necessary to increase the positioning accuracy of the magnetic head.

Requirements for increasing the positioning accuracy of the magnetic head are as follows:

(1) Vibrations such as residual vibrations of a slider in a servo track write mode should be reduced.

(2) Vibrations of a spindle motor should be reduced.

(3) Vibrations of a head actuator for positioning the magnetic head should be reduced.

(4) The gain of a servo system should be increased to increase the servo bandwidth.

For reducing the vibrations of the head actuator, it is effective to increase the resonant frequency of a translational mode caused by the rigidity of bearings and a structural body such as an arm. Two-stage actuators are highly effective to meet the requirements (3), (4). The present invention is concerned particularly with a twostage tracking actuator.

In general magnetic disk drives, an actuator arm is rotatably mounted on a base, and a load beam (suspension) is fixed at its proximal end to the distal end of the actuator arm. A slider which supports a magnetic head thereon is mounted on the distal end of the load beam. A coil is mounted on the other end of the actuator arm. A magnetic circuit fixed to a base of the magnetic disk device and the coil jointly serve as a voice coil motor. When the coil is energized, forces act on the coil, rotating the actuator arm.

General head actuators suffer from the following problems:

(a) Head actuators for use in general 2.5- or 3.5-inch magnetic disk drives suffer from resonance due to the rigidity of the actuator arm at frequencies of 10 kHz or below. It is difficult to greatly increase this resonant frequency because of various limitations with respect to a yaw angle and power consumption, for example.

(b) The resonant frequency of an actuator translational mode due to the rigidity of the bearings is lower than 10 kHz, e.g., in the range from 4 kHz to 5 kHz, for example. It is difficult to increase the resonant frequency because the bearing rigidity cannot be increased even if the bearing biasing pressure is varied.

Owing to the resonance described above in (a) and (b), the servo bandwidth of the general magnetic disk drives can be increased to at most about 1 kHz. Since the error in following tracks cannot sufficiently be reduced because of this limitation, it has been highly difficult to increase the track pitch. There have been proposed two-stage tracking actuators which incorporate piezoelectric devices for accurately positioning a magnetic head. For example, two piezoelectric devices are disposed one on each side of the actuator arm, and voltages are applied to the piezoelectric devices in such directions as to expand one of the piezoelectric devices and contract the other piezoelectric device. The magnetic head is rotated in the direction of the piezoelectric device to which the voltage is applied to contract the piezoelectric device.

With the conventional two-stage tracking actuators which incorporate piezoelectric devices, however, when a voltage in a direction opposite to the direction of polarization of the piezoelectric device is applied to the piezoelectric device, the piezoelectric device is exposed to a high-temperature atmosphere, or the piezoelectric device is subjected to aging, the piezoelectric device is depolarized, progressively reducing its displacement per unit voltage. Therefore, the piezoelectric device cannot produce a desired stroke after it has been used for a certain long period of time.

Furthermore, since a high voltage such as of about ±30 V is required to actuate the piezoelectric device, a circuit for supplying the high voltage is needed, and noise tends to be applied to the signal line due to the high drive voltage. In addition, the conventional actuators which incorporate piezoelectric devices cannot efficiently be manufactured and are expensive to manufacture. Because of these many problems, the conventional actuators which incorporate piezoelectric devices have not been practically available.

There has been proposed a head actuator for moving only a slider a small distance under electromagnetic forces. Since electromagnetic forces generally decrease as the size of the actuator is reduced, a large current will be required to generate drive forces unless the mass of the movable parts is greatly reduced. Actuating only the slider is also disadvantageous from the standpoint of power consumption.

Moreover, it is not easy to manufacture a magnetic circuit. Inasmuch as a magnetic flux generating mechanism is spaced about 1 mm from a head device (transducer), noise may be added to the signal owing to a leakage flux when the head actuator is in operation. Another problem is that since a magnetic attractive force is applied as a drive force to move the slider, the force is not linearly generated in response to a current, making it difficult to effect positioning control in a wide movable range.

The inventor has proposed a two-stage head actuator in an effort to solve the above problems as disclosed in co-pending application Ser. No. 08/728,079. According to the disclosed two-stage head actuator, a drive force for a microactuator is electromagnetically generated, and the movable component of the microactuator is mounted on the tip end of an actuator arm by a criss-cross spring or a hinge.

If the criss-cross spring is used, then the two-stage head actuator can be designed such that the rotational rigidity of the movable component of the microactuator will be low, and at the same time the lateral and vertical translational rigidity thereof will be high. The low rotational rigidity makes it possible to develop a large displacement with a small current. Therefore, only the microactuator is effective to perform a seek mode for a short stroke. The high lateral and vertical translational rigidity increases the servo bandwidth of the actuator, resulting in an increase in the positional accuracy. The electromagnetic motor is also advantageous in that it is highly reliable for a long period of time and inexpensive to manufacture.

However, the two-stage head actuator which uses the criss-cross spring to install the microactuator is problematic in that it cannot easily be manufactured because the criss-cross spring and a head mounting block which supports the criss-cross spring are complex in structure.

SUMMARY OF THE INVENTION

It is therefore an object of the present invention to provide a head actuator which is simple in structure, highly reliable, and capable of positioning a head accurately.

In accordance with an aspect of the present invention, there is provided a head actuator for use in a disk drive having a base, comprising an actuator arm rotatably mounted on the base, first drive means for rotating the actuator arm, a suspension supporting on a distal end thereof a head slider having a transducer, a head attachment plate fixed to a proximal end of the suspension, a protrusion disposed on the head attachment plate, a cavity defined in a distal end of the actuator arm, and second drive means for angularly moving the head attachment plate with respect to the actuator arm.

Alternatively, the protrusion may be disposed on the distal end of the actuator arm, and the cavity may be defined in the head attachment plate, with the protrusion being rotatably inserted in the cavity. Preferably, the second drive means comprises a permanent magnet fixed to the actuator arm and a coil fixed to the head attachment plate in confronting relation to the permanent magnet with a gap defined therebetween. The coil may be mounted on the actuator arm, and the permanent magnet may be mounted on the head attachment plate.

In accordance with another aspect of the present invention, there is provided a microactuator assembly comprising a suspension adapted to support on a distal end thereof a head slider having a transducer, a head attachment plate having an end fixed to a proximal end of the suspension, a coil mounted on the head attachment plate near another end thereof, and a protrusion disposed on the head attachment plate.

Alternatively, a permanent magnet, instead of the coil, may be mounted on the head attachment plate, and a cavity, instead of the protrusion, may be defined in the head attachment plate.

In accordance with a further aspect of the present invention, there is provided a disk drive comprising a housing having a base, a disk rotatably disposed in the housing, a head slider having a transducer for writing data and reading data to and from the disk, and a head actuator for moving the head slider across tracks on the disk, the head actuator comprising an actuator arm rotatably mounted on the base, first drive means for rotating the actuator arm, a suspension supporting the head slider on a distal end thereof, a head attachment plate fixed to a proximal end of the suspension, a protrusion disposed on the head attachment plate, a cavity defined in a distal end of the actuator arm and in which the protrusion is rotatably inserted, and second drive means for angularly moving the head attachment plate with respect to the actuator arm.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 14 is a side elevational view, partly in cross section, of a head actuator according to a seventh embodiment of the present invention.

DETAILED DESCRIPTION OF THE PREFERRED EMBODIMENTS

Figure 1:
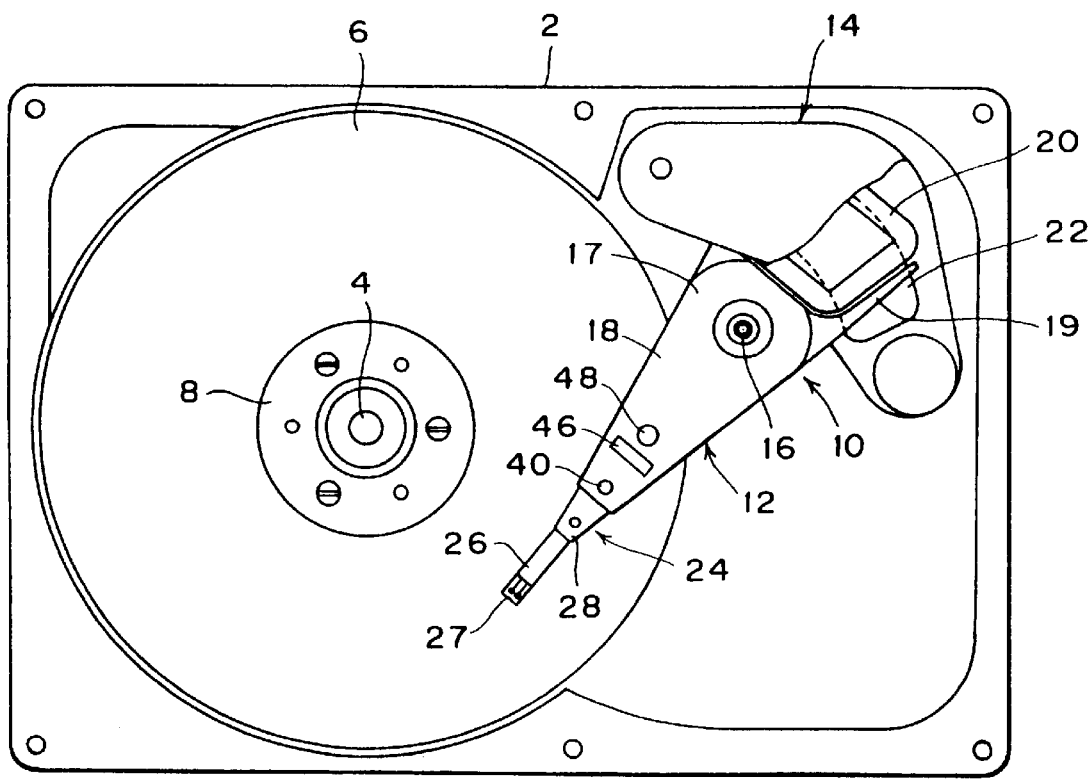
FIG. 1 is a plan view of a magnetic disk drive which incorporates a head actuator according to the present invention.

Like or corresponding parts are denoted by like or corresponding reference numerals throughout the views.

As shown in FIG. 1, a magnetic disk drive which incorporates a head actuator according to the present invention has a housing including a base 2 to which a shaft 4 is fixed and a spindle hub (not shown) disposed around the shaft 4 and rotatable by an inner hub motor. Magnetic disks 6 and spacers are alternately mounted on the spindle hub. The magnetic disks 6 are secured at spaced intervals to the spindle hub by a disk clamp 8 fastened to the spindle hub by a screw.

Figure 2:
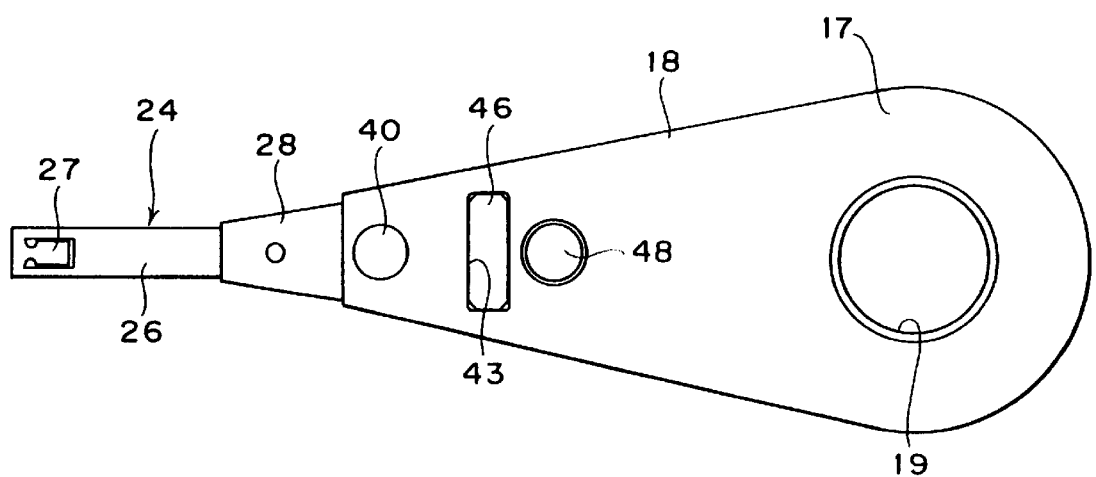
FIG. 2 is a plan view of a head actuator according to a first embodiment of the present invention.

A rotary two-stage head actuator 10 comprises a coarse actuator 12 and a microactuator 24 mounted on the coarse actuator 12 (see also FIG. 2). The coarse actuator 12 includes an actuator block 17 rotatably mounted by a bearing on a shaft 16 fixed to the base 2.

The actuator block 17 has a plurality of integral actuator arms 18. A coil support 19 which is integral with the actuator block 17 extends remotely from the actuator arms 18 across the shaft 16. A flat coil 20 is supported on the coil support 19. A magnetic circuit 22 mounted on the base 2 and the flat coil 20 jointly make up a voice coil motor (VCM) 14.

The microactuator 24 is mounted on a distal end of each of the actuator arms 18. The microactuator 24 comprises a suspension 26 and a head attachment plate 28 spot-welded to the proximal end of the suspension 26. The head attachment plate 28 is angularly movably attached to the distal end of the actuator arm 18 by an attachment (described later on). The suspension 26 includes a flexible tongue or flexure 27 disposed on its distal end, and a head slider 30 (see FIG. 3) having an electromagnetic transducer is mounted on the flexible tongue 27.

Figure 6:
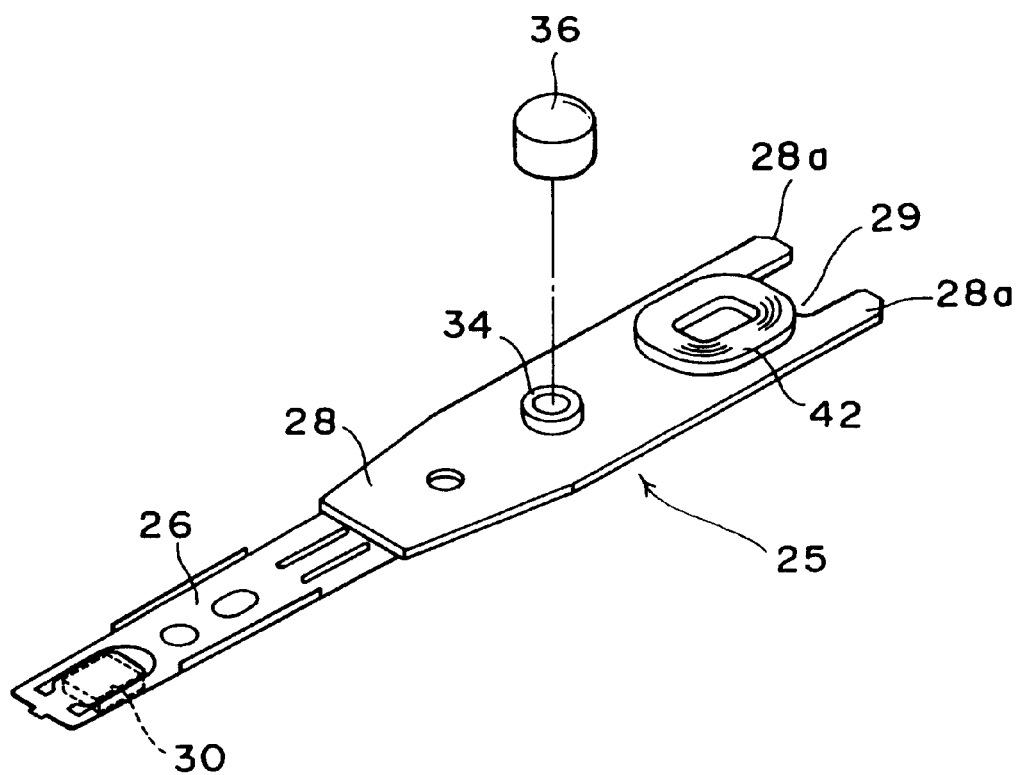
FIG. 6 is a perspective view of a movable component of a microactuator of the head actuator according to the first embodiment.

As best shown in FIG. 6, the head attachment plate 28 has an integral cylindrical protrusion 34 disposed on an upper surface thereof. The cylindrical protrusion 34 has a height ranging from about 0.2 to 0.3 mm. The head attachment plate 28 is made of a magnetic material such as steel or the like, and has a thickness of about 0.2 mm. The suspension 26 is made of stainless steel, and has a thickness of about 25 μm. Each of the actuator arms 18 has a thickness ranging from about 1.0 to 1.1 mm.

Figure 4:
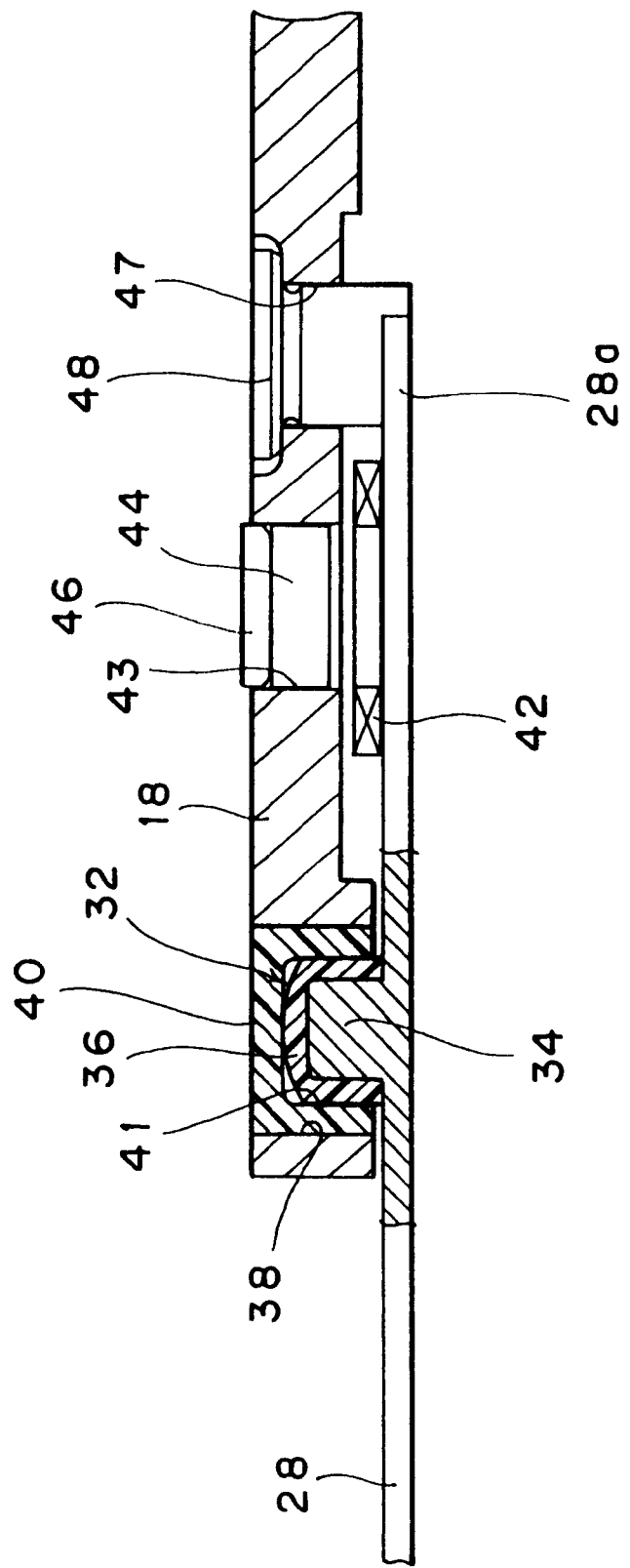
FIG. 4 is an enlarged fragmentary cross-sectional view of the head actuator according to the first embodiment.
Figure 5:
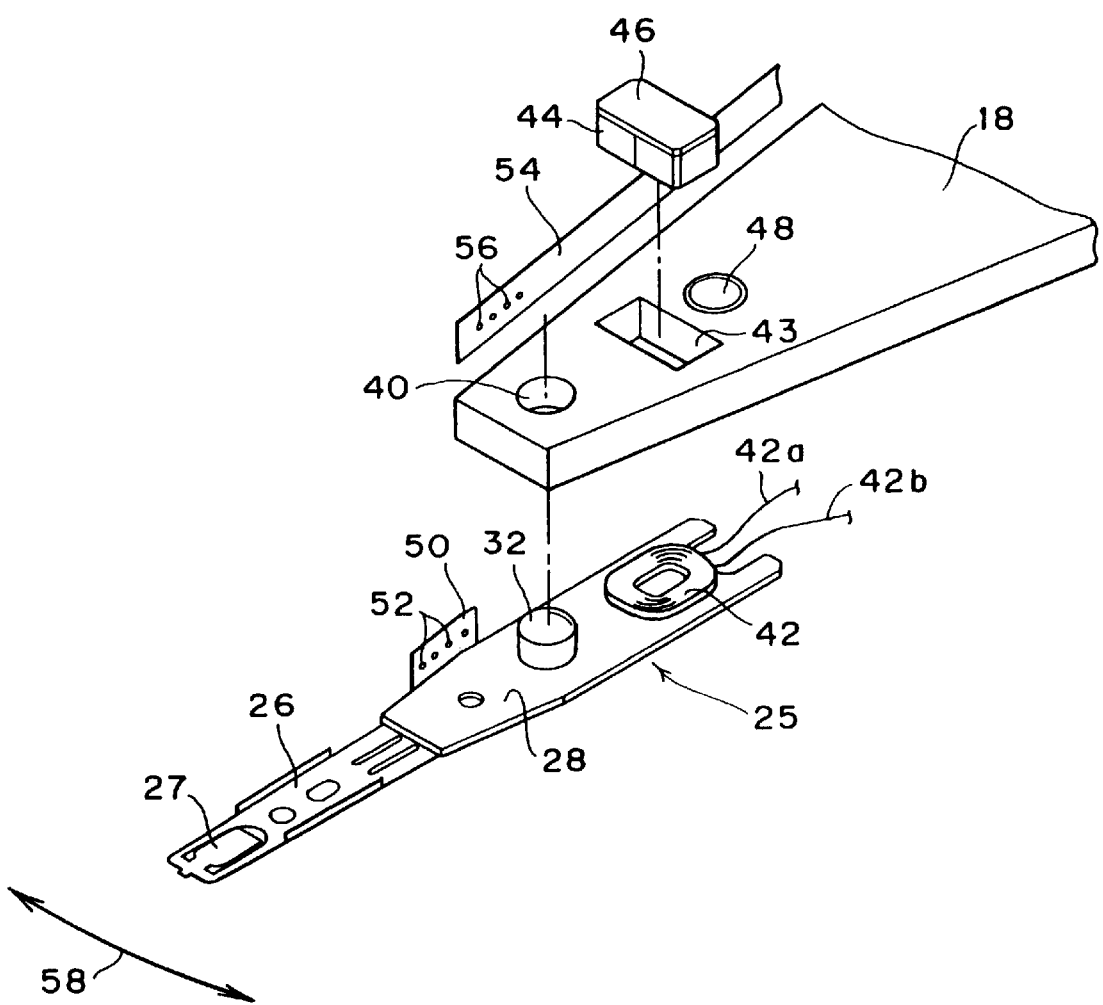
FIG. 5 is an exploded perspective view of the head actuator according to the first embodiment.

The cylindrical protrusion 34 is covered with a resin cap 36, making up a shaft 32 as shown in FIGS. 4 and 5. The resin cap 36 has a spherically round tip end. A coil 42 is fixed to the head attachment plate 28 by an adhesive or the like. The head attachment plate 28 includes a pair of fingers 28a projecting remotely from the suspension 26, with a U-shaped recess 29 defined between the fingers 28a.

As shown in FIG. 5, a flexible terminal plate 50 having four terminals 52 is integral with a side edge of the head attachment plate 28. The terminals 52 are connected to a wiring pattern (not shown) disposed on the suspension 26. A pair of leads 42a, 42b is connected to the coil 42. The microactuator 24 has a movable component 25 (see FIGS. 5 and 6) which has a weight ranging from about 80 to 90 mg.

As best shown in FIG. 4, each of the actuator arms 18 has a hole 38 defined in the distal end thereof, and a receptacle 40 made of synthetic resin is press-fitted in the hole 38. The receptacle 40 has a cavity 41 defined therein and receiving the shaft 32 therein. The receptacle 40 may be fixedly disposed in the hole 38 by an adhesive or the like, rather than being press-fitted in the hole 38.

Figure 3:
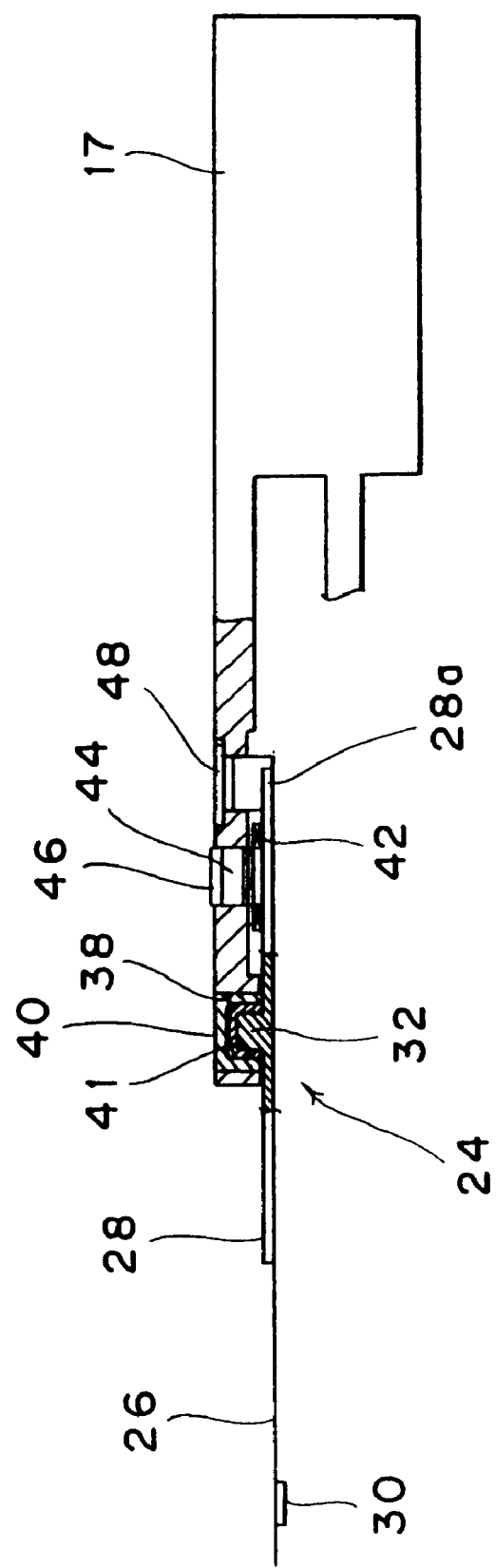
FIG. 3 is a side elevational view, partly in cross section, of the head actuator according to the first embodiment.

As shown in FIGS. 3 and 4, the shaft 32 on the head attachment plate 28 is inserted in the cavity 41 in the receptacle 40 fixed to the actuator arm 18, so that the head attachment plate 28 is angularly movably mounted on the distal end of the actuator arm 18. A gap whose width ranges from about several μm to ten and several μm is defined between the outer circumferential surface of the shaft 32 and the inner circumferential surface of the cavity 41.

Each of the actuator arms 18 has a hole 43 defined therein in alignment with the coil 42, and permanent magnets 44 are inserted and fixedly disposed in the hole 43 by an adhesive or the like. A yoke 46 is mounted on the permanent magnets 44 and magnetically attracted thereto. The permanents magnet 44 are magnetized in the thickness direction of the actuator arm 18. A stopper 48 inserted and fixedly disposed in a hole 47 defined in the actuator arm 18 is inserted in the U-shaped recess 29 in the head attachment plate 28. The angular range in which the microactuator 24 is limited by abutment of the stopper 48 against the fingers 28a.

Figure 4A:
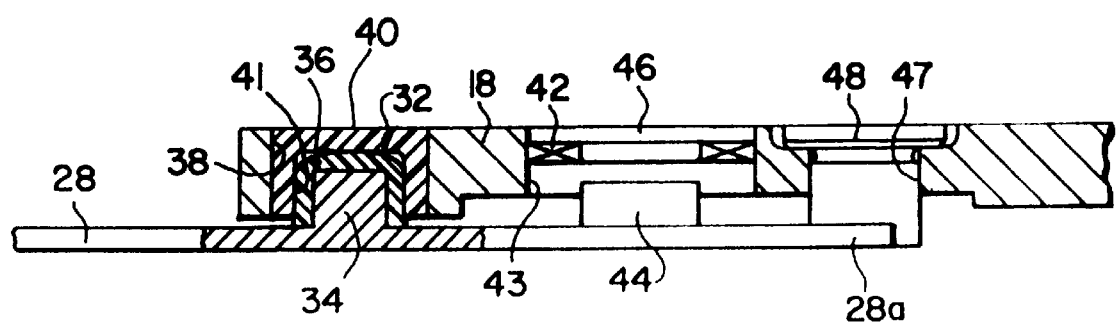
FIG. 4A is a modification of the FIG. 4 embodiment in which the magnets are positioned on the head attachment plate and the coil is positioned on the actuator arm.

FIG. 4A is a modification of the FIG. 4 embodiment in which the magnets 44 are positioned on the head attachment plate 28 and the coil 42 is positioned on the actuator arm 18. Otherwise, the FIG. 4A embodiment is essentially the same as the FIG. 4 embodiment.

Referring back to FIG. 5, a relaying flexible printed circuit board (relaying FPC) 54 is attached to a side edge of the actuator arm 18, and has terminals 56 connected to the terminals 52 of the suspension 26. The relaying FPC 54 is connected to a main flexible printed circuit board (main FPC) (not shown) that is connected to an electronic circuit unit outside of the magnetic disk drive.

When the coil 42 is energized, a magnetic circuit which is made up of the magnets 44 and the yoke 46 applies a force to the coil 42, angularly moving the movable component 25 of the microactuator 24 in the directions indicated by the arrow 58. Since the movable component 25 of the microactuator 24 is angularly moved about the shaft 32, it is preferable that the center of gravity of the movable component 25 of the microactuator 24 be aligned with the center of the shaft 32.

A magnetic attractive force acting between the magnets 44 and the head attachment plate 28 that is made of a magnetic material serves to bias the shaft 32 against removal from the cavity 41 of the receptacle 40. Therefore, the magnets 44 serve both the purpose of driving the microactuator 24 and the purpose of biasing the shaft 32. If two magnets 44, each having a size of 2 mm×2 mm×0.5 mm, are juxtaposed and produce a magnetic flux density of 4 k gausses, then the attractive force acting between the permanent magnets 44 and the head attachment plate 28 is of about 510 mN. Since the movable component 25 of the microactuator 24 has a weight ranging from about 80 to 90 mg, as described above, it can withstand a shock of up to about 500 G. Alternatively, the shaft 32 may be biased by a leaf spring.

Figure 7A:
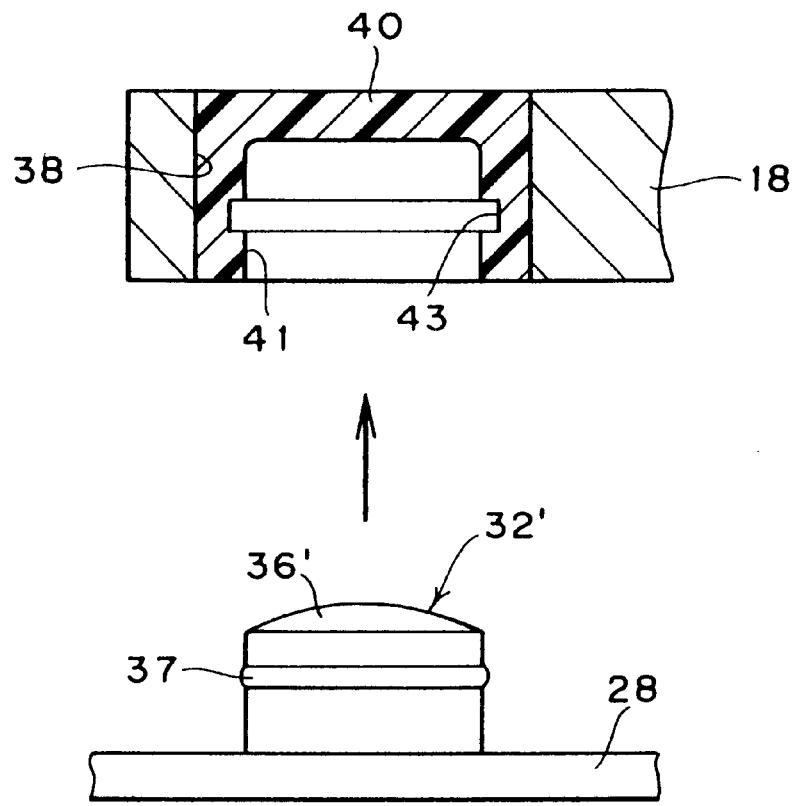
FIGS. 7A and 7B are cross-sectional views of a structure by which a shaft is prevented from being removed.
Figure 7B:
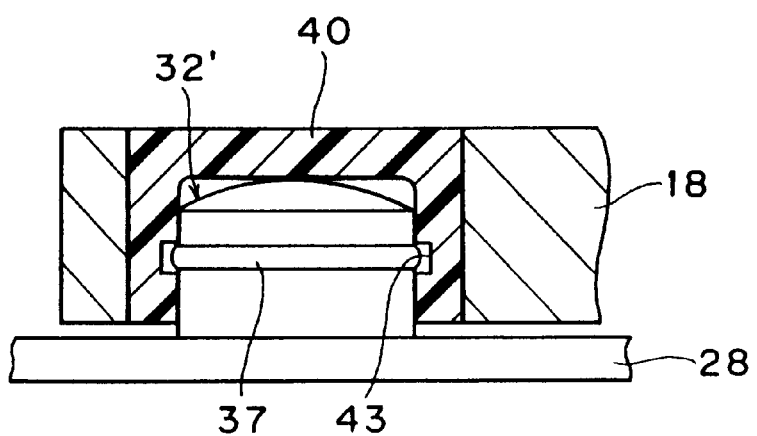

A structure by which the shaft 32 is prevented from being removed as shown in FIGS. 7A and 7B may be employed. As shown in FIG. 7A, a resin cap 36' on a shaft 32' disposed on the head attachment plate 28 has an annular ridge 37 on an outer circumferential surface thereof. The cavity 41 in the resin receptacle 40 fixedly disposed in the hole 38 in the actuator arm 18 has an annular groove 43.

When the shaft 32' is pressed into the recess 41, the annular ridge 37 is snapped into the annular groove 43, as shown in FIG. 7B. Even when a shock greater than the magnetic attractive force from the magnet 44 is applied to the microactuator, the annular ridge 37 fitted in the annular groove 43 prevents the shaft 32' fixed to the head attachment plate 28 from being removed from the cavity 41 in the resin receptacle 40 fixed to the actuator arm 18.

Figure 8:
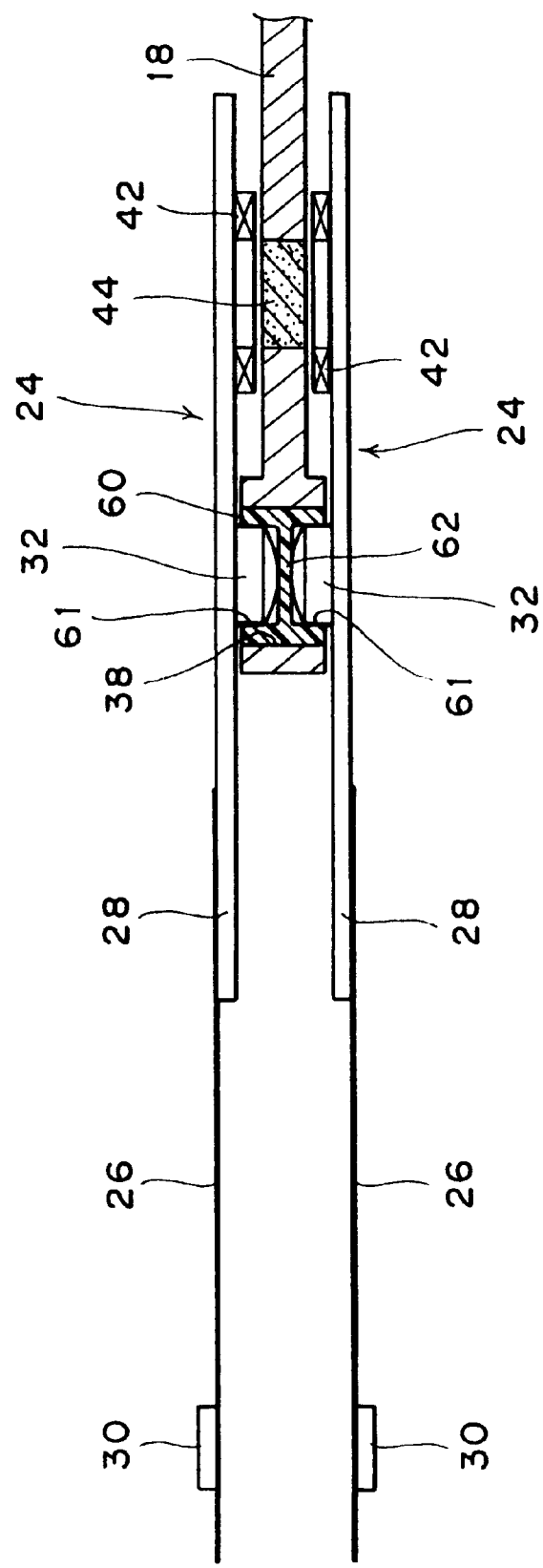
FIG. 8 is a side elevational view, partly in cross section, of a head actuator according to a second embodiment of the present invention.

A head actuator according to a second embodiment of the present invention is illustrated in FIG. 8. According to the second embodiment, two microactuators 24 are mounted on the distal end of each of the actuator arms 18. A receptacle 60 which has an H-shaped vertical cross section is press-fitted in the hole 38 defined in the distal end of the actuator arm 18. The receptacle 60 has two cavities 61 divided by a partition wall 62. Shafts 32 of upper and lower head attachment plates 28 are angularly movably inserted in the respective cavities 61.

In the second embodiment, each of the upper and lower head attachment plates 28 is made of a magnetic material. Therefore, only the permanent magnet 44 may be fixed to the actuator arm 18, with no yoke being required. When the coil 42 on the upper microactuator 24 is energized, only the upper coil 42 is subjected to a force, causing only the upper microactuator 24 to rotate about the shaft 32. When the coil 42 on the lower microactuator 24 is energized, only the lower microactuator 24 rotates about the shaft 32. Therefore, the upper and lower microactuators 24 can individually be controlled.

Figure 9:
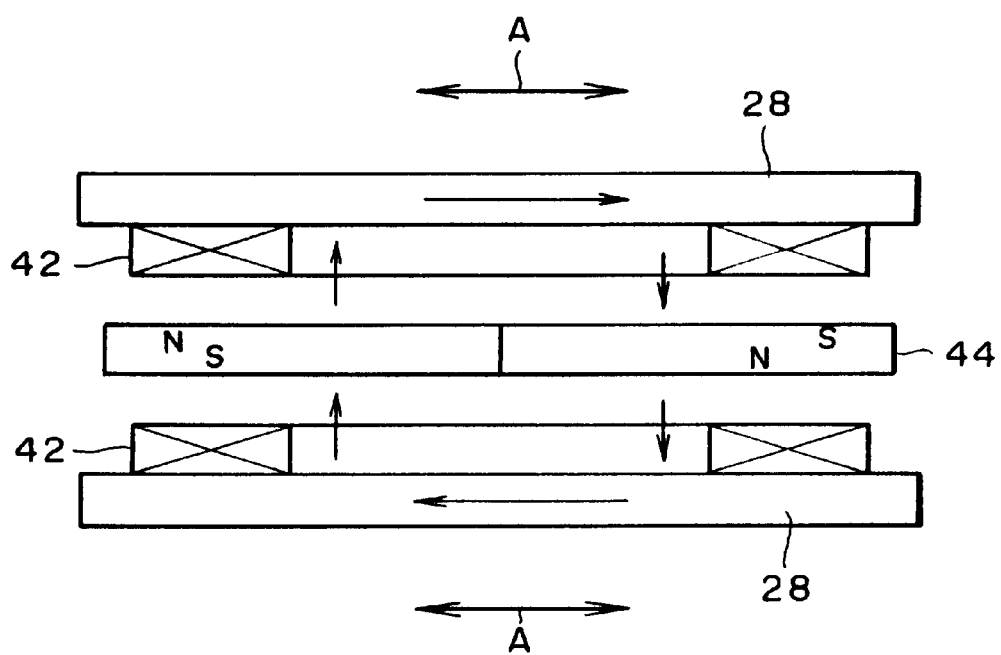
FIG. 9 is a view showing the direction in which a magnet is magnetized as viewed from a slider of the head actuator according to the second embodiment shown in FIG. 8 and a magnetic circuit of the head actuator.

FIG. 9 shows the direction in which the magnet 44 is magnetized as viewed from the slider 30 and a magnetic circuit of the head actuator according to the second embodiment. The magnet 44 is magnetized in the thickness direction of the actuator arm 18 such that the polarity on one side is opposite to the polarity on the other side. The microactuators 24 are angularly movable in the directions indicated by the arrows A.

Figure 10:
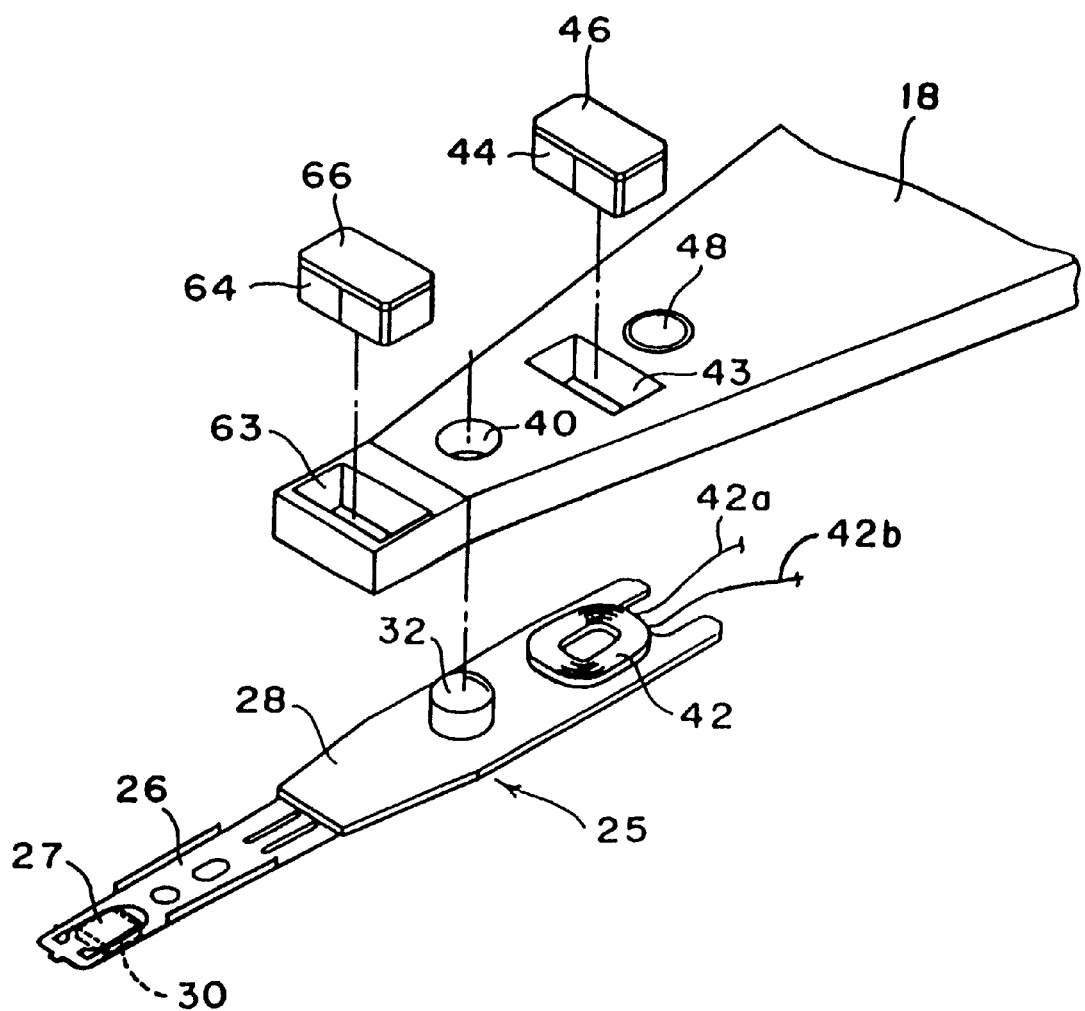
FIG. 10 is an exploded perspective view of a head actuator according to a third embodiment of the present invention.

FIG. 10 shows in perspective view of a head actuator according to a third embodiment of the present invention. In the third embodiment, two sets of permanent magnets 44, 64 are fixed to each of the actuator arms 18 at equal distances in the longitudinal direction of the actuator arm 18 from the receptacle 40 which receives the shaft 32 on the head attachment plate 28.

Specifically, two holes 43, 63 are defined in the actuator arm 18 at longitudinally symmetric positions on the actuator arm 18 with respect to the receptacle 40, and the magnets 44, 64 are fixedly disposed in the holes 43, 63. Yokes 46, 66 are magnetically attracted to the magnets 44, 64. The magnets 44 face the coil 42 fixed to the head attachment plate 28 across a gap. The head attachment plate 28 is made of a magnetic material such as steel or the like.

According to the third embodiment, a gap whose width ranges from about several μm to ten and several μm is defined between the outer circumferential surface of the shaft 32 and the side wall which defines the cavity 41 of the receptacle 40. Since the two sets of magnets 44, 64 apply magnetic attractive forces to attract the head attachment plate 28 substantially symmetrically with respect to the shaft 32, any tilt of the shaft 32 in the receptacle 40 can be reduced. The magnetic attractive forces produced in the third embodiment are twice the magnetic attractive forces produced in the first embodiment, making the head actuator resistant to greater shocks.

Figure 11:
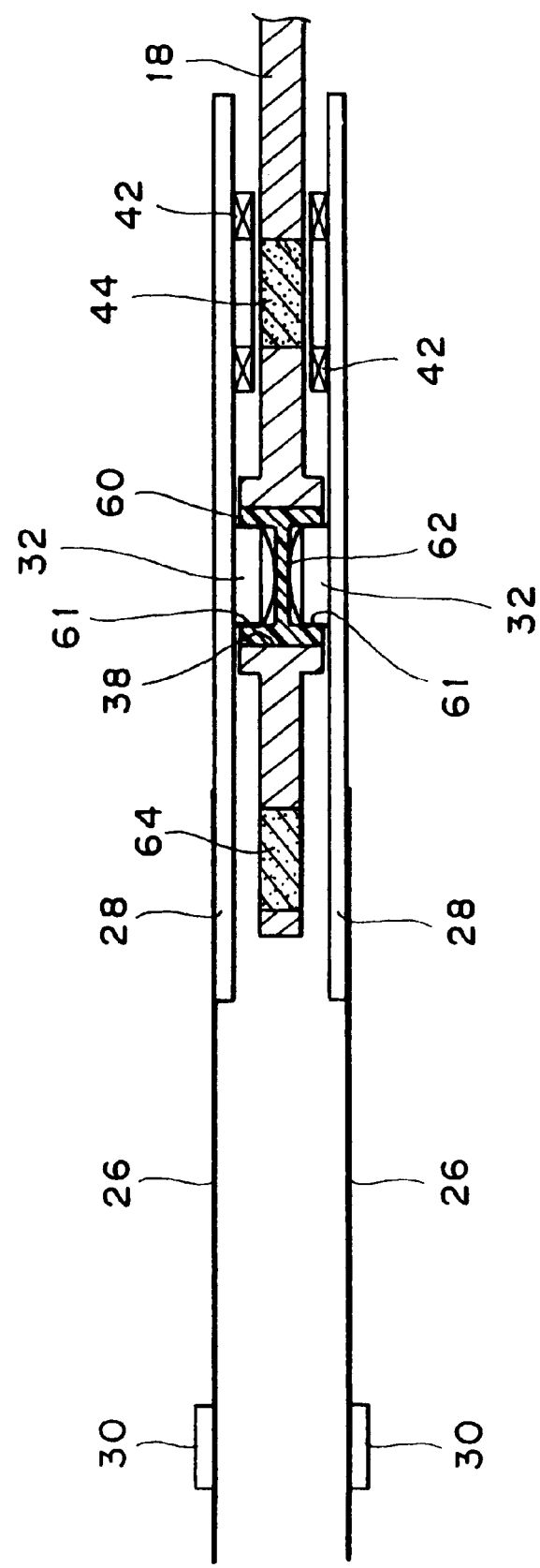
FIG. 11 is a side elevational view, partly in cross section, of a head actuator according to a fourth embodiment of the present invention.

FIG. 11 shows a head actuator according to a fourth embodiment of the present invention. The head actuator according to the fourth embodiment is similar to the head actuator according to the second embodiment shown in FIG. 8, but differs therefrom in that a magnet 64 is fixed to the distal end of the actuator arm 18.

In the fourth embodiment, the movable components 25 of two microactuators are attached respectively to upper and lower surfaces of each of the actuator arms 18 shown in FIG. 8. Since the head attachment plates 28 are made of a magnetic material, yokes 46,66 may be dispensed with as is the case with the second embodiment shown in FIG. 8. Coils may be disposed on the respective head attachment plates 28 in confronting relation to the magnet 64 for producing doubled drive forces per unit current thereby to reduce power consumption.

Figure 12:
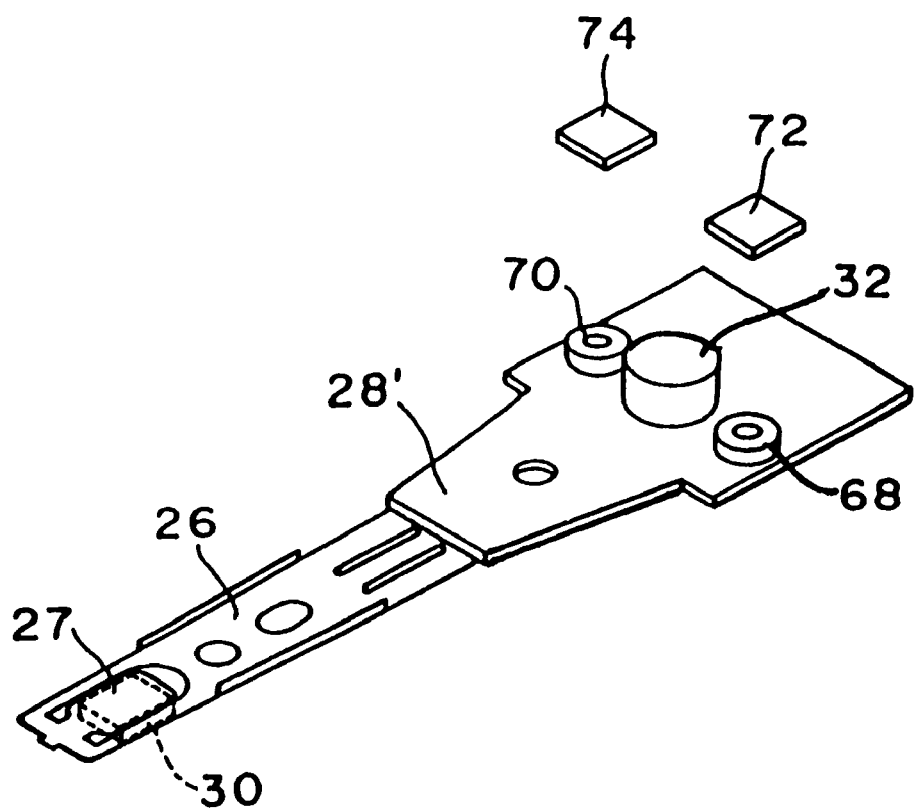
FIG. 12 is a perspective view of a head actuator according to a fifth embodiment of the present invention.

A head actuator according to a fifth embodiment of the present invention is shown in FIG. 12. In the fifth embodiment, two coils 68, 70 are fixedly mounted on a head attachment plate 281 symmetrically with respect to the shaft 32 and are spaced in a direction perpendicular to the longitudinal direction of the suspension 26. Magnets 72, 74 are fixed to an actuator arm (not shown) in confronting relation to the respective coils 68, 70. As is the case with the third embodiment shown in FIG. 10, the two magnets 72, 74 bias the head attachment plate 281 of a magnetic material toward the actuator arm 18 for making the head actuator resistant to shocks.

Since two coils are fixed to the head attachment plate 28', the power consumption is reduced, and the coils may be lower in profile. When the coils 68, 70 are energized, they generate only forces tending to angularly move the microactuator, but not generate forces in the direction of a seek mode, so that the microactuator is prevented from wobbling when it is in operation. In order to align the center of gravity of the movable component of the microactuator with the center of the shaft 32, a counterbalance may be mounted on the proximal end of the head attachment plate 28'.

Figure 12A:
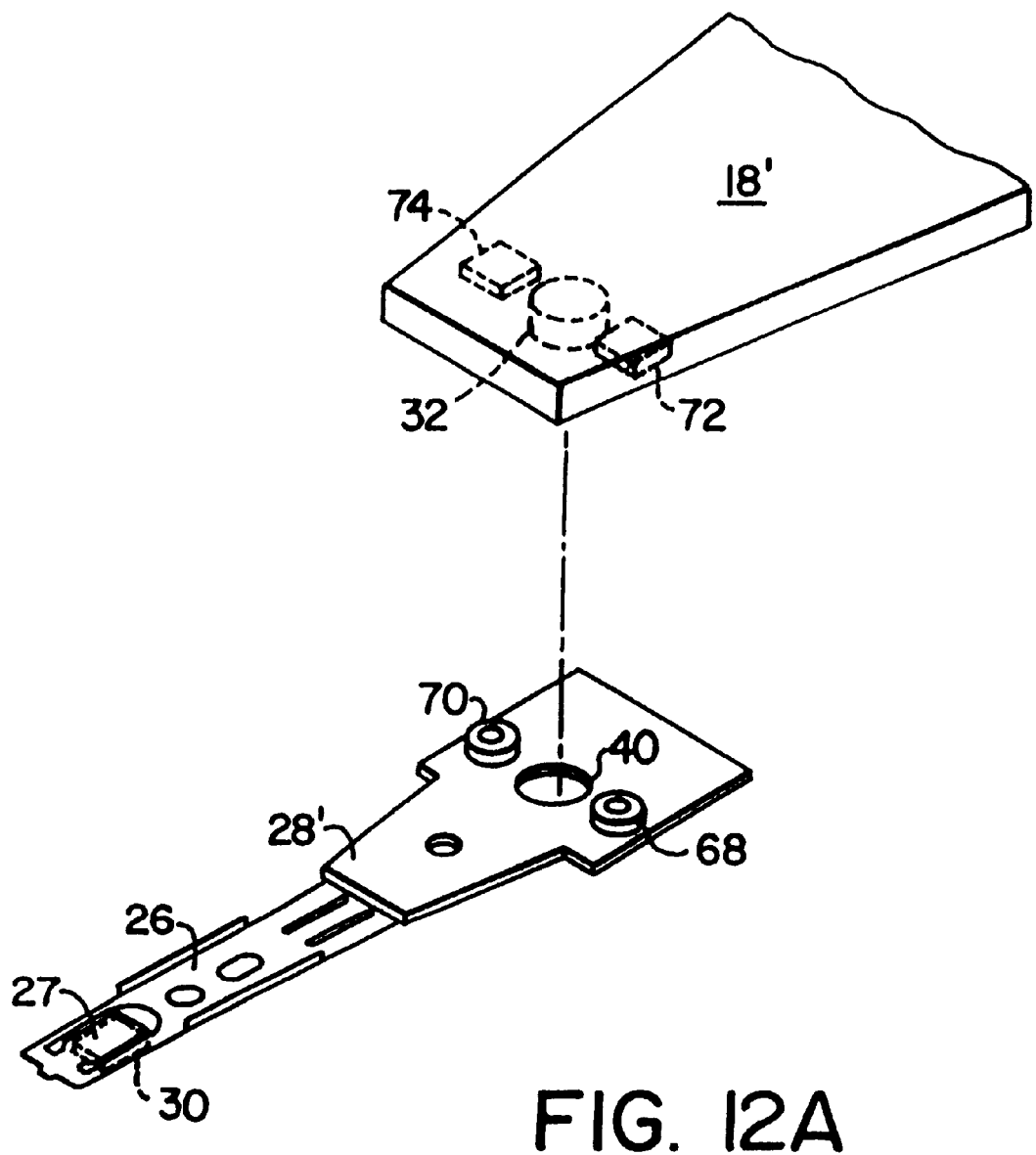
FIG. 12A is a modification of the FIG. 12 embodiment in which the shaft is positioned on the actuator arm and the receptacle is found on the head attachment plate.

FIG. 12A is a modification of the FIG. 12 embodiment in which the shaft 32 is positioned on the actuator arm 18' and the receptacle 40 is located on the head attachment plate 28'. Otherwise the FIG. 12A embodiment is essentially the same as the FIG. 12 embodiment.

Figure 13:
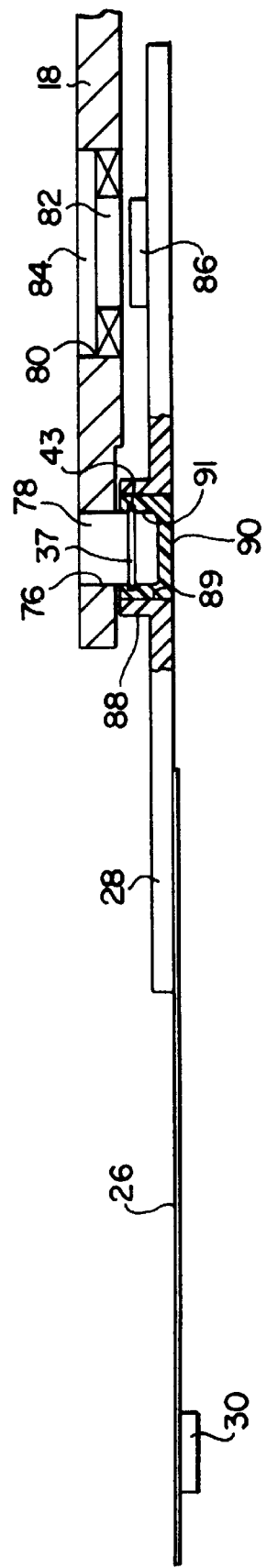
FIG. 13 is a side elevational view, partly in cross section, of a head actuator according to a sixth embodiment of the present invention.

FIG. 13 shows a head actuator according to a sixth embodiment of the present invention. According to the third embodiment, the shaft and the receptacle in each of the first through fifth embodiments are positionally switched around, i.e., a shaft is fixed to the actuator arm 18 and a receptacle is fixed to the head attachment plate 28. Specifically, a shaft 78 is fixedly disposed in a hole 76 defined in a distal end of the actuator arm 18, and a receptacle 90 of resin is press-fitted in a hole 89 defined in a cylindrical protrusion 88 integral with the head attachment plate 28. The receptacle 90 has a cavity 91 defined therein, and the shaft 78 is angularly movably inserted in the cavity 91. As in FIGS. 7A and 7B, ridge 37 and groove 43 may also be used in this embodiment to better secure the shaft 78 within the receptacle 90.

In the sixth embodiment, a coil 82 and a yoke 84 are fixedly disposed in a hole 80 defined in the actuator arm 18. A permanent magnet 86 is fixedly mounted on the head attachment plate 28 in confronting relation to the coil 82. Because the yoke 84 is disposed in the hole 80, a magnetic attractive force acts between the magnet 86 and the yoke 84 for thereby biasing the shaft 78 against removal from the receptacle 90.

Figure 13A:
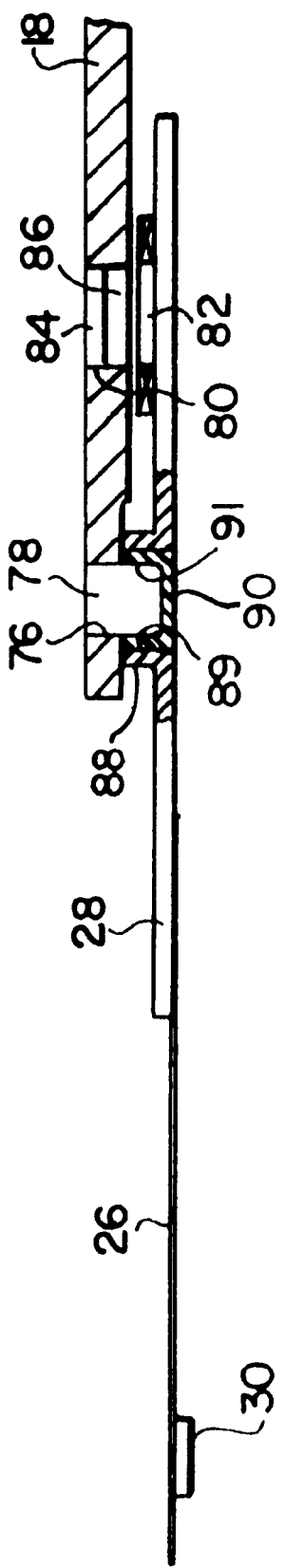
FIG. 13A is a modification of the FIG. 13 embodiment in which the coil is positioned on the head attachment plate and the magnets are positioned on the actuator arm.

According to the sixth embodiment, inasmuch as the coil 82 is mounted in the actuator arm 18, leads of the coil 82 can easily be placed in a desired pattern. As is the case with the first through fifth embodiments, the coil 82 may be fixed to the head attachment plate 28, and the magnet 86 may be fixed to the actuator arm 18, such as shown in FIG. 13A.

FIG. 14 shows a head actuator according to a seventh embodiment of the present invention. In the seventh embodiment, the head attachment plates 28 shown in FIG. 13 are angularly movably mounted on respective upper and lower surfaces of the actuator arm 18. Specifically, a shaft 92 is fixed to the distal end of the actuator arm 18 and has upper and lower ends projecting upwardly and downwardly from the actuator arm 18. Receptacles 90 fixed to the upper and lower head attachment plates 28 are angularly movably fitted over the projecting ends of the shaft 92.

Figure 15:
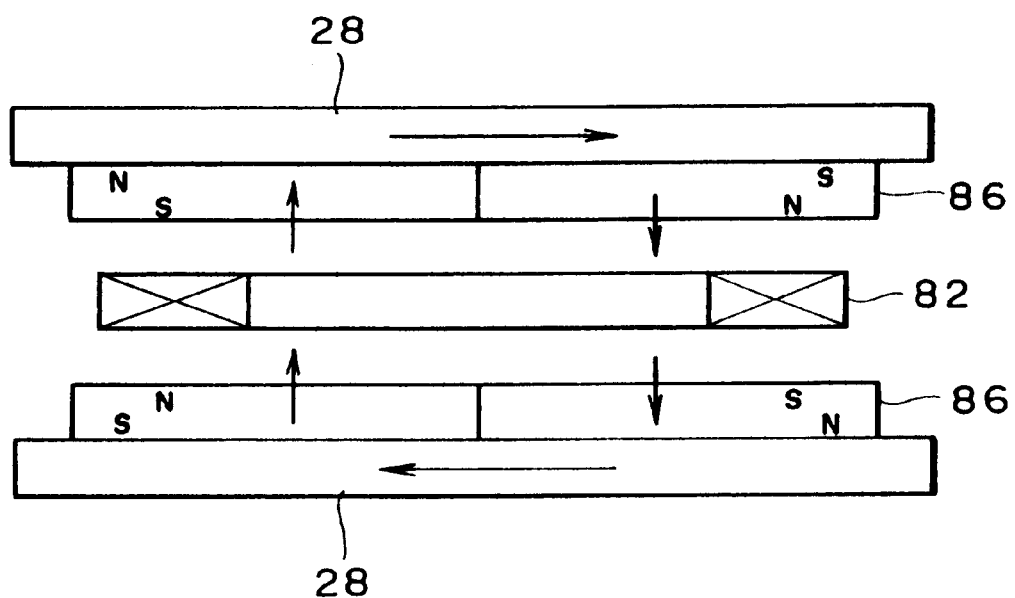
FIG. 15 is a view showing the direction in which magnets are magnetized as viewed from a slider of the head actuator according to the seventh embodiment shown in FIG. 14 and a magnetic circuit of the head actuator.

In the seventh embodiment, yokes may be dispensed with, and a biasing pressure for attracting the head attachment plates 28 to the actuator arm 18 is generated by magnetic attractive forces produced between upper and lower magnets 86. FIG. 15 shows the direction in which the magnets 86 are magnetized as viewed from the slider. The polarities of the confronting surfaces of the magnets 86 need to be opposite to each other.

According to the present invention, there is provided a two-stage head actuator which is simple in structure, highly reliable, and capable of positioning a head accurately. By simplifying the structure by which a microactuator is attached, the head actuator can efficiently be manufactured.

What is claimed is:

1. A head actuator for use in a disk drive having a base, comprising:
   an actuator arm rotatably mounted on said base and having a cavity defined in a distal end thereof;
   first drive means for rotating said actuator arm;
   a suspension supporting on a distal end thereof a head slider having a transducer;
   a head attachment plate fixed to a proximal end of said suspension and having a protrusion rotatably inserted in said cavity; and
   second drive means for angularly moving said head attachment plate with respect to said actuator arm.

2. A head actuator according to claim 1, wherein said second drive means comprises a first permanent magnet magnetized in a thickness direction of said actuator arm and fixed to the distal end of said actuator arm, and a first coil disposed on said head attachment plate in confronting relation to said first permanent magnet with a gap defined therebetween.

3. A head actuator according to claim 1, wherein said second drive means comprises a first permanent magnet magnetized in a thickness direction of said head attachment plate and fixed to the head attachment plate, and a first coil disposed on the distal end of said actuator arm in confronting relation to said first permanent magnet with a gap defined therebetween.

4. A head actuator according to claim 2, wherein said second drive means further comprises a second permanent magnet fixed to the distal end of said actuator arm in substantially symmetrical relation to said first permanent magnet with respect to said cavity.

5. A head actuator according to claim 4, wherein said second drive means further comprises a second coil fixed to said head attachment plate in confronting relation to said second permanent magnet with a gap defined therebetween.

6. A head actuator according to claim 5, wherein said first coil and said second coil are spaced from each other in a direction substantially perpendicular to a longitudinal direction of said suspension.

7. A head actuator according to claim 1, wherein said protrusion is made of synthetic resin, and said cavity is defined by a member of synthetic resin.

8. A head actuator according to claim 7, wherein said cavity is defined by a side wall having an annular groove defined therein, and said protrusion has an annular ridge disposed on an outer circumferential surface thereof and fitted in said annular groove.

9. A head actuator for use in a disk drive having a base, comprising:
   an actuator arm rotatably mounted on said base and having a protrusion disposed on a distal end thereof;
   first drive means for rotating said actuator arm;
   a suspension supporting on a distal end thereof a head slider having a transducer;
   a head attachment plate fixed to a proximal end of said suspension and having a cavity in which said protrusion is rotatably inserted; and
   second drive means for angularly moving said head attachment plate with respect to said actuator arm.

10. A head actuator according to claim 9, wherein said second drive means comprises a first permanent magnet magnetized in a thickness direction of said actuator arm and fixed to the distal end of said actuator arm, and a first coil disposed on said head attachment plate in confronting relation to said first permanent magnet with a gap defined therebetween.

11. A head actuator according to claim 9, wherein said second drive means comprises a first permanent magnet magnetized in a thickness direction of said head attachment plate and fixed to the head attachment plate, and a first coil disposed on the distal end of said actuator arm in confronting relation to said first permanent magnet with a gap defined therebetween.

12. A head actuator according to claim 10, wherein said second drive means further comprises a second permanent magnet fixed to the distal end of said actuator arm in substantially symmetrical relation to said first permanent magnet with respect to said protrusion.

13. A head actuator according to claim 12, wherein said second drive means further comprises a second coil fixed to said head attachment plate in confronting relation to said second permanent magnet with a gap defined therebetween.

14. A head actuator according to claim 13, wherein said first coil and said second coil are spaced from each other in a direction substantially perpendicular to a longitudinal direction of said suspension.

15. A head actuator according to claim 9, wherein said protrusion is made of synthetic resin, and said cavity is defined by a member of synthetic resin.

16. A head actuator according to claim 15, wherein said cavity is defined by a side wall having an annular groove defined therein, and said protrusion has an annular ridge disposed on an outer circumferential surface thereof and fitted in said annular groove.

17. A disk drive comprising:
   a housing having a base;
   a disk rotatably disposed in said housing;
   a head slider having a transducer for writing data and reading data to and from said disk; and
   a head actuator for moving said head slider across tracks on said disk;
   said head actuator comprising:
      an actuator arm rotatably mounted on said base and having a cavity defined in a distal end thereof;
      first drive means for rotating said actuator arm;
      a suspension supporting said head slider on a distal end thereof;
      a head attachment plate fixed to a proximal end of said suspension and having a protrusion rotatably inserted in said cavity; and
      second drive means for angularly moving said head attachment plate with respect to said actuator arm.

18. A disk drive according to claim 17, wherein said second drive means comprises a permanent magnet magnetized in a thickness direction of said actuator arm and fixed to the distal end of said actuator arm, and a coil disposed on said head attachment plate in confronting relation to said permanent magnet with a gap defined therebetween.

19. A disk drive according to claim 17, wherein said second drive means comprises a permanent magnet magnetized in a thickness direction of said head attachment plate and fixed to the head attachment plate, and a coil disposed on the distal end of said actuator arm in confronting relation to said permanent magnet with a gap defined therebetween.

20. A disk drive comprising:
   a housing having a base;
   a disk rotatably disposed in said housing;
   a head slider having a transducer for writing data and reading data to and from said disk; and
   a head actuator for moving said head slider across tracks on said disk;
   said head actuator including:

an actuator arm rotatably mounted on said base and having a protrusion disposed on a distal end thereof;

first drive means for rotating said actuator arm;

a suspension supporting said head slider on a distal end thereof, a head attachment plate fixed to a proximal end of said suspension and having a cavity in which said protrusion is rotatably inserted; and second drive means for angularly moving said head attachment plate with respect to said actuator arm.

21. A disk drive according to claim 20, wherein said second drive means comprises a permanent magnet magnetized in a thickness direction of said actuator arm and fixed to the distal end of said actuator arm, and a coil disposed on said head attachment plate in confronting relation to said permanent magnet with a gap defined therebetween.

22. A disk drive according to claim 20, wherein said second drive means comprises a permanent magnet magnetized in a thickness direction of said head attachment plate and fixed to the head attachment plate, and a coil disposed on the distal end of said actuator arm in confronting relation to said permanent magnet with a gap defined therebetween.

* * * * *